United States Patent
Jensen et al.

(10) Patent No.: US 8,460,750 B2
(45) Date of Patent: Jun. 11, 2013

(54) METHOD FOR CREATING A DRY LUBRICANT LAYER

(75) Inventors: Jens Dahl Jensen, Berlin (DE); Ursus Krüger, Berlin (DE); Gabriele Winkler, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 678 days.

(21) Appl. No.: 12/663,301

(22) PCT Filed: May 28, 2008

(86) PCT No.: PCT/EP2008/056547
§ 371 (c)(1),
(2), (4) Date: Dec. 7, 2009

(87) PCT Pub. No.: WO2008/148679
PCT Pub. Date: Dec. 11, 2008

(65) Prior Publication Data
US 2010/0221423 A1     Sep. 2, 2010

(30) Foreign Application Priority Data
Jun. 7, 2007  (DE) .......................... 10 2007 026 626

(51) Int. Cl.
*B05D 3/02* (2006.01)

(52) U.S. Cl.
USPC ........................................................ 427/226

(58) Field of Classification Search
USPC ........................................................ 427/226
See application file for complete search history.

(56) References Cited

U.S. PATENT DOCUMENTS

| | | | |
|---|---|---|---|
| 4,885,188 A | 12/1989 | Hasegawa et al. | 427/126.1 |
| 6,890,890 B2* | 5/2005 | Gahagan | 508/192 |
| 2002/0041928 A1 | 4/2002 | Budaragin | 427/229 |
| 2002/0086111 A1 | 7/2002 | Byun et al. | 427/255.394 |
| 2003/0159764 A1* | 8/2003 | Goto | 148/519 |

(Continued)

FOREIGN PATENT DOCUMENTS

| | | |
|---|---|---|
| DE | 3225382 | 1/1984 |
| GB | 847800 | 9/1960 |

(Continued)

OTHER PUBLICATIONS

Putz. et al., "Spin Deposition of MoSx films," Thin Solid Films 351, 1999, pp. 119-124.*

(Continued)

*Primary Examiner* — Michael Cleveland
*Assistant Examiner* — Robert Vetere
(74) *Attorney, Agent, or Firm* — King & Spalding L.L.P.

(57) ABSTRACT

In a method for creating a dry lubricant layer, the layer is formed by a coating material which is first applied to a substrate, on which the dry lubricant layer is to be produced. The coating material contains a solvent such as ethanethiol and the precursors of a metal sulphide, in particular a metaloxysulphide, such as a molybdenum salt of dithiocarboxylic acid. Once the coating material has been applied to the substrate, the material is subjected to thermal treatment, whereby the solvent evaporates and the precursors of the metal sulphide react with one another to form the dry lubricant layer. This advantageously permits the creation of dry lubricant layers containing a high fraction of metal sulphide, giving the layers improved sliding friction characteristics. Another advantage is that the oxysulphide layers that have been formed are also particularly stable in relation to an oxidation.

21 Claims, 1 Drawing Sheet

U.S. PATENT DOCUMENTS

| | | | |
|---|---|---|---|
| 2004/0033911 A1* | 2/2004 | Mikami et al. | 508/511 |
| 2004/0166340 A1 | 8/2004 | Cairns et al. | 428/472 |
| 2006/0210818 A1 | 9/2006 | Binkle et al. | 428/469 |

FOREIGN PATENT DOCUMENTS

| | | |
|---|---|---|
| WO | 03021004 | 3/2003 |
| WO | 2004013378 | 2/2004 |
| WO | 2004104261 | 12/2004 |

OTHER PUBLICATIONS

Pütz, J et. al., Thin Solid Films, Elsevier-Sequoia S.A., Lausanne, CH, Bd. 351, Nr. 1-2, Aug. 30, 1999, Seiten 119-124 (6 Pages).

International Search Report and Written Opinion for Application No. PCT/EP2008/056547 (19 pages), Jun. 17, 2009.

* cited by examiner

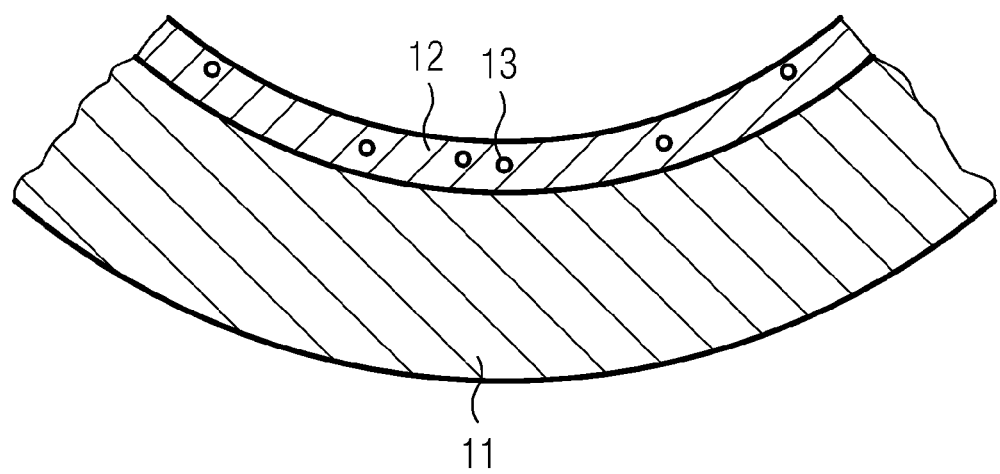

METHOD FOR CREATING A DRY LUBRICANT LAYER

CROSS-REFERENCE TO RELATED APPLICATIONS

This application is a U.S. National Stage Application of International Application No. PCT/EP2008/056547 filed May 28, 2008, which designates the United States of America, and claims priority to German Application No. 10 2007 026 626.1 filed Jun. 7, 2007, the contents of which are hereby incorporated by reference in their entirety.

TECHNICAL FIELD

The invention relates to a process for producing a dry lubricant film of a metal sulfide, in which the dry lubricant film is applied to a substrate.

BACKGROUND

A process of the type mentioned in the introduction may be gathered from DE 32 25 382 A1. This process involves the coating of a sliding sleeve of a motor vehicle clutch disengager with a dry lubricant film in order to ensure perpetual sliding loading for this component. The dry lubricant used may be a pulverulent molybdenum disulfide which is bound in a polymer matrix. The polymer matrix is applied together with the powder to the sliding sleeve, where it is cured.

SUMMARY

According to various embodiments, a process can be specified for improved dry lubricant films of a metal sulfide which makes it possible to produce comparatively good dry lubricating properties.

According to an embodiment, a process for producing a dry lubricant film of a metal sulfide, in which the dry lubricant film is applied to a substrate, may comprise:—a coating material consisting of a solvent and dissolved precursors of the metal sulfide is initially applied to the substrate, and—the substrate provided with the coating material is subjected to heat treatment, in which the solvent evaporates and the precursors of the metal sulfide are converted into the metal sulfide to form the dry lubricant film.

According to a further embodiment, the precursor used can be a metal sulfide, in particular molybdenum disulfide, and the solvent used is a monothiocarboxylic acid or a dithiocarboxylic acid, in particular dithioformic acid. According to a further embodiment, the precursor used can be a metal salt of a dithiocarboxylic acid, in particular dithioacetic acid or dithiopropionic acid, and the solvent used is a thiol, in particular ethanethiol or propanethiol. According to a further embodiment, the metal sulfide produced can be a metal oxysulfide. According to a further embodiment, the metal oxysulfide can be produced from a sulfonic acid, in particular methanesulfonic acid, and the salt of a carboxylic acid, in particular molybdenum diacetate. According to a further embodiment, the coating material additionally may contain at least one carboxylic acid. According to a further embodiment, the coating material may contain particles, in particular nanoparticles, which are incorporated in the dry lubricant film.

BRIEF DESCRIPTION OF THE DRAWINGS

Further details of the invention are described below with reference to the drawing, the single figure of which, FIG. 1, shows a section through a bearing shell with a dry lubricant coating which is produced according to an exemplary embodiment of the process.

DETAILED DESCRIPTION

According to various embodiments, a coating material may consisting of a solvent and dissolved precursors of the metal sulfide is initially applied to the substrate, and the substrate provided with the coating material is subjected to heat treatment, in which the solvent evaporates and the precursors of the metal sulfide are converted into the metal sulfide to form the dry lubricant film. This production process advantageously makes it possible to produce dry lubricant films which have a comparatively high proportion of metal sulfide and therefore have particularly good sliding properties.

The process of applying ceramic precursors to metallic components in order to form ceramic films on these components is known per se and is described, for example, in US 2002/0086111 A1, WO 2004/013378 A1, US 2002/0041928 A1, WO 03/021004 A1 and WO 2004/104261 A1. The processes described in these documents relate to the production of ceramic coatings on components in general, wherein ceramic precursors of the ceramics to be produced are used to produce films, these precursors, after they have been applied, being converted to the ceramic to be formed by means of heat treatment.

The ceramic precursors contain the materials of which the ceramic material of the film to be formed is composed, and furthermore have constituents which, during the chemical conversion which proceeds when the coating material is subjected to heat treatment, lead to crosslinking of the ceramic material. Examples of ceramic precursors can be gathered from the cited prior art documents and should be selected depending on the intended application.

By way of example, it is possible that the ceramic to be formed comprises an oxide and/or a nitride and/or an oxynitride. The formation of oxides, nitrides or oxynitrides advantageously makes it possible to produce particularly stable films. The precursors of such ceramics have to provide the elements N and/or O in order to form the oxidic, nitridic or oxynitridic ceramic.

According to an embodiment, it is provided that the precursor used is a metal sulfide, in particular molybdenum disulfide, and the solvent used is a monothiocarboxylic acid or a dithiocarboxylic acid, in particular dithioformic acid. As an alternative, it is also possible for the precursor used to be a metal salt of a dithiocarboxylic acid, in particular dithioacetic acid or dithiopropionic acid, and the solvent used to be a thiol, in particular ethanethiol or propanethiol. The films can advantageously be produced in this way using standard substances readily available on the market.

A further embodiment provides for the metal sulfide produced to be a metal oxysulfide. This has the advantage that the dry lubricant film, which normally has a certain susceptibility to oxidation when pure sulfides are used and is impaired in its function by this process, is protected against oxygen attack by targeted production of oxysulfide. This makes it possible to achieve improved endurance of the dry lubricant film, particularly in an oxidizing atmosphere.

It is advantageous if the metal oxysulfide is produced from a sulfonic acid, in particular methanesulfonic acid, and the salt of a carboxylic acid, in particular molybdenum diacetate. The use of these standard substances advantageously means that it is possible to produce the dry lubricant film at low cost. Furthermore, molybdenum is particularly suitable as the metal component of the (oxy)sulfide ceramic to be produced since, on account of a laminar microstructure formation, it has particularly good sliding properties.

According to an embodiment, it is provided that the coating material additionally contains at least one carboxylic acid. The addition of a carboxylic acid makes it possible, in particular, to set the viscosity of the coating material such that the coating material can be suitably prepared for the favored coating process. Depending on the viscosity set, the coating material can be applied by spraying, knife coating, rolling, brushing, dipping, spincoating or other processes.

A further embodiment is obtained if the coating material contains particles, in particular nanoparticles, which are incorporated in the dry lubricant film. Here, it is possible to select different types of particles; by way of example, it is possible to incorporate particles of a UV light absorber, e.g. titanium oxide or zinc oxide. This makes it possible for heat treatment of the film to be carried out, or at least supported, by means of UV light irradiation. The UV light absorbers convert the energy content of the light in the coating material into heat.

In addition, further solids (oxides, nitrides, borides, carbides and metals) may be added to the coating material. It is also possible to add colorants in the form of pigments in order to impart a certain color to the dry lubricant film. This is advantageous, for example, in order to make it possible to detect the wear on the dry lubricant film by the color of the surface changing. The particles of solid matter may also contribute to further improvement of the sliding properties of the surface.

A bearing shell according to FIG. 1 forms a substrate 11 which is coated by means of a dry lubricant film 12. Embedded in this dry lubricant film 12 are nanoparticles 13 which, for example, may preferably be arranged on the surface (formation of the dry lubricant film as a gradient film). If the nanoparticles are formed by a colorant, the coloring of the dry lubricant film will disappear as the wear progresses since no colorant nanoparticles 13 are provided in the lower regions of the dry lubricant film.

As an alternative to a gradient film, a multi-layer film could also be formed in the bearing shell (substrate 11), the colorant particles being present only in the lowermost layer (not shown). A change in color toward the colorant used then shows that it is necessary to replace the bearing shell.

The dry lubricant film 12 is particularly preferably formed as a metal oxysulfide—in particular as a molybdenum oxysulfide. The benefit of the oxysulfide is that the molecular sliding motion, which brings about the positive properties as a dry lubricant film and is generally known from the sulfide, is also possible in the film structure of the oxysulfide. However, the simultaneous incorporation of oxygen atoms and sulfur atoms when forming the film advantageously also reduces the affinity of the molybdenum atoms to atmospheric oxygen, and the oxysulfide film is therefore less susceptible to corrosion.

The sliding properties of the oxysulfide, which are comparable to sulfide, can be attributed to the fact that sulfur and oxygen are homologous elements. The oxygen in the alcohols and carboxylic acids used as precursors in the coating material can therefore readily be replaced by sulfur. Appropriate compounds are alkanethiols (mercaptans) or mono- and dithiocarboxylic acids. The alkanethiols react in a more strongly acidic manner than the analogous alcohols, such that these alkanethiols can also be used to incipiently etch the workpiece surface, which is necessary in order to form the solid lubricant film 12 of metal sulfides or metal oxysulfides. The carboxylic acids, mono- and dithiocarboxylic acids and alkanethiols used additionally contain carbon chains having between 1 and 24 carbon atoms. The hydrocarbon chains may have straight branching or may be annular. It is possible for both single bonds and also double and triple bonds to be present. It is equally possible for a benzene ring to be present. Furthermore, hydrogen atoms in the hydrocarbon chain can be replaced by alkyl, alkenyl, alkynyl or alkthio groups. By way of example, the following empirical formulae are specified as examples of the solvents used in the coating material:

Monothiocarboxylic acids: R—COSH
Dithiocarboxylic acids: R—CSSH
Carboxylic acids: R—COOH
Alkanethiols: R—$CH_2$SH, where R represents an alkyl, alkenyl, alkynyl or aryl radical which, for its part, may in turn be branched.

The organic and organometallic liquids present in the coating material which contain sulfur instead of the oxygen are responsible for the formation of the metal sulfides. This sulfur is preferably part of a thiol group.

It is possible to produce oxysulfide compounds, such as e.g. molybdenum oxysulfide, from a coating material containing organic and organometallic compounds which contain both oxygen and sulfur in the functional groups (e.g. molybdenum diacetate and ethanethiol or methylsulfonic acid).

What is claimed is:

1. A process for producing a dry lubricant film of a metal sulfide, in which the dry lubricant film is applied to a substrate, the process comprising the steps of:
    applying a coating material comprising a solvent and dissolved precursors of the metal sulfide to the substrate, wherein the solvent comprises a monothiocarboxylic acid or a dithiocarboxylic acid, and
    subjecting the substrate provided with the coating material to heat treatment, in which the solvent evaporates and the precursors of the metal sulfide are converted into the metal sulfide to form the dry lubricant film.

2. The process according to claim 1, wherein the metal sulfide produced is a metal oxysulfide.

3. The process according to claim 2, wherein the metal oxysulfide is produced from a sulfonic acid and the salt of a carboxylic acid.

4. The process according to claim 3, wherein the sulfonic acid comprises methanesulfonic acid.

5. The process according to claim 3, wherein the carboxylic acid comprises molybdenum diacetate.

6. The process according to claim 1, wherein the coating material contains particles which are incorporated in the dry lubricant film.

7. The process according to claim 1, wherein the precursors of the metal sulfide comprise molybdenum disulfide.

8. The process according to claim 1, wherein the solvent used comprises dithioformic acid.

9. The process according to claim 1, wherein the coating material contains nanoparticles which are incorporated in the dry lubricant film.

10. A method for providing a lubricant film comprising the steps of:
    applying a coating material comprising a solvent and dissolved precursors of the metal sulfide to a surface, and
    subjecting the surface provided with the coating material to heat treatment, in which the solvent evaporates and the precursors of the metal sulfide are converted into the metal sulfide to form the dry lubricant film
    wherein the metal sulfide produced comprises a metal oxysulfide.

11. The method according to claim 10, wherein the solvent comprises a monothiocarboxylic acid or a dithiocarboxylic acid.

12. The method according to claim 10, wherein the metal oxysulfide is produced from a sulfonic acid and the salt of a carboxylic acid.

13. The method according to claim 10, wherein the metal coating material additionally comprises at least one carboxylic acid.

14. The method according to claim 10, wherein the solvent comprises dithioformic acid.

15. The method according to claim 10, wherein the metal oxysulfide is produced from a sulfonic acid and the salt of a carboxylic acid.

16. The method according to claim 15, wherein the sulfonic acid comprises methanesulfonic acid.

17. The method according to claim 15, wherein the carboxylic acid comprises molybdenum diacetate.

18. The method according to claim 10, wherein the coating material contains nanoparticles which are incorporated in the dry lubricant film.

19. A method for producing a dry lubricant film of a metal sulfide, in which the dry lubricant film is applied to a substrate, the process comprising:

initially applying a coating material comprising a sulfonic acid and the salt of a carboxylic acid to the substrate, and subjecting the substrate provided with the coating material to a heat treatment to form a dry lubricant film comprising a metal oxysulfide.

20. The method according to claim 19, wherein the sulfonic acid comprises methanesulfonic acid.

21. The method according to claim 19, wherein the salt of the carboxylic acid comprises molybdenum diacetate.

* * * * *